(12) United States Patent
Hanai (10) Patent No.: US 10,935,644 B2
(45) Date of Patent: Mar. 2, 2021

(54) AXIS MISALIGNMENT DETERMINING APPARATUS

(71) Applicant: TOYOTA JIDOSHA KABUSHIKI KAISHA, Toyota (JP)

(72) Inventor: Hiromasa Hanai, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 16/152,586

(22) Filed: Oct. 5, 2018

(65) Prior Publication Data

US 2019/0107610 A1  Apr. 11, 2019

(30) Foreign Application Priority Data

Oct. 10, 2017 (JP) .............................. JP2017-197221

(51) Int. Cl.
*G01S 7/497* (2006.01)
*G01S 17/931* (2020.01)

(52) U.S. Cl.
CPC .......... *G01S 7/4972* (2013.01); *G01S 17/931* (2020.01)

(58) Field of Classification Search
CPC ...... G01S 7/4972; G01S 17/931; G01S 7/497; G01S 7/40; G01S 17/42; G01S 17/86; G01S 7/4808; G01S 17/88; G01S 17/46; G01C 15/002; G01C 5/00; G01C 15/008; G05D 2201/0213; G05D 1/024; G05D 1/0231; G05D 1/0248; G05D 1/0255; G05D 1/0242; G01B 11/002; G01B 11/14; G01B 11/026; G01B 11/26; G01B 11/03; G01B 11/04;

(Continued)

(56) References Cited

U.S. PATENT DOCUMENTS 4,526,135 A * 7/1985 Calhoun ................ G01B 7/003
                                                    122/382
4,693,608 A * 9/1987 Kitagawa ........... G01B 11/2433
                                                    348/128

(Continued)

FOREIGN PATENT DOCUMENTS

JP      2003149343 A    5/2003
JP      2016-053563 A   4/2016

OTHER PUBLICATIONS

"On-Site Sensor Recalibration of a Spinning Multi-Beam LiDAR System Using Automatically-Detected Planar Targets " to Chen et al. , Sensors, 12, pp. 13736-13752 (Year: 2012).*

*Primary Examiner* — Mohamed K Amara
(74) *Attorney, Agent, or Firm* — Sughrue Mion, PLLC (57) ABSTRACT

An axis misalignment determining apparatus is configured to determine an axis misalignment in a sensor mounted on a vehicle by using a determining member mounted on the vehicle. The axis misalignment determining apparatus is provided with: a storage configured to store therein a result of detection of the determining member by the sensor in a condition in which there is no axis misalignment, as a detection result in a normal case; an acquirer configured to detect the determining member by using the sensor and configured to obtain it as a present detection result; and a determinator configured to determine whether or not there is an axis misalignment in the sensor by comparing the present detection result with the detection result in the normal case.

5 Claims, 13 Drawing Sheets

(58) Field of Classification Search
CPC ...... G01B 21/24; G01B 21/047; G01B 7/003; G02B 26/10
See application file for complete search history.

(56) References Cited

U.S. PATENT DOCUMENTS

| | | | | |
|---|---|---|---|---|
| 5,465,493 | A * | 11/1995 | Sobottke | G01B 11/27 33/286 |
| 5,900,940 | A * | 5/1999 | Aoshima | G01B 11/2433 250/559.34 |
| 9,714,083 | B2 * | 7/2017 | Rawlings | B05D 5/063 |
| 9,751,618 | B2 * | 9/2017 | Rawlings | B64D 45/00 |
| 9,833,986 | B1 * | 12/2017 | Susnjara | B33Y 50/02 |
| 9,868,135 | B2 * | 1/2018 | Williams | B63B 1/36 |
| 10,086,626 | B1 * | 10/2018 | Herrmann | B41J 3/4073 |
| 10,105,877 | B2 * | 10/2018 | Rawlings | B32B 37/203 |
| 10,124,359 | B2 * | 11/2018 | Raman | G05D 1/0234 |
| 10,336,109 | B2 * | 7/2019 | Reiniger | G01B 11/2504 |
| 10,378,935 | B1 * | 8/2019 | Raman | G01D 11/24 |
| 2004/0118624 | A1 * | 6/2004 | Beuhler | G01S 17/58 180/167 |
| 2007/0068020 | A1 * | 3/2007 | Adrian | B23B 49/00 33/286 |
| 2010/0096472 | A1 * | 4/2010 | Klein, II | B05B 12/004 239/73 |
| 2010/0147328 | A1 * | 6/2010 | Shindou | B08B 7/0042 134/1.1 |
| 2012/0219699 | A1 * | 8/2012 | Pettersson | B05B 12/122 427/8 |
| 2012/0320364 | A1 * | 12/2012 | Hallberg | B23K 26/048 356/4.01 |
| 2014/0242285 | A1 * | 8/2014 | Pettersson | B05B 12/084 427/427.2 |
| 2016/0349356 | A1 | 12/2016 | Takaki | |
| 2018/0023276 | A1 * | 1/2018 | Puskas | A47K 3/26 4/444 |
| 2018/0216942 | A1 * | 8/2018 | Wang | G01S 17/89 |
| 2018/0224850 | A1 * | 8/2018 | Kroop | G08G 1/00 |
| 2018/0284292 | A1 * | 10/2018 | Ono | G01S 19/22 |
| 2018/0328725 | A1 * | 11/2018 | Borgstrom | B23K 26/035 |
| 2018/0354468 | A1 * | 12/2018 | Krishnan | B60R 11/0264 |
| 2019/0016306 | A1 * | 1/2019 | Krishnan | G01N 21/15 |
| 2019/0071188 | A1 * | 3/2019 | Adarve Lozano | B64D 39/00 |
| 2019/0184888 | A1 * | 6/2019 | Hori | B60Q 1/076 |
| 2020/0089973 | A1 * | 3/2020 | Efland | G05D 1/024 |

* cited by examiner

AXIS MISALIGNMENT DETERMINING APPARATUS

CROSS-REFERENCE TO RELATED APPLICATIONS

This application is based upon and claims the benefit of priority of the prior Japanese Patent Application No. 2017-197221, filed on Oct. 10, 2017, the entire contents of which are incorporated herein by reference.

BACKGROUND

1. Technical Field

Embodiments of the present disclosure relate to an axis misalignment determining apparatus configured to determine an axis misalignment or an axis deviation in a sensor mounted on a vehicle.

2. Description of the Related Art

For this type of apparatus, there is known an apparatus configured to determine an axis misalignment (i.e., a misalignment or deviation in a detection direction) in various sensors, such as, for example, a radar and LiDAR (Light Detection and Ranging or Laser Imaging Detection and Ranging), which are mounted on a vehicle. For example, Japanese Patent Application Laid Open No. 2016-053563 (Patent Literature 1) discloses a technology/technique in which a ratio of the number of recognitions of a preceding vehicle by using both a radar and a camera with respect to the number of recognitions of the preceding vehicle by using at least the camera is calculated, and in which an axis misalignment in a vertical plane, which occurs in the radar, is detected in accordance with a value of the calculated ratio.

The axis misalignment in the sensor may occur during running of the vehicle and during parking in which the vehicle is left for a long time. It is thus normally preferable to perform the detection of the axis misalignment immediately after the vehicle starts to run. In the technology/technique disclosed in the Patent Literature 1, however, the axis misalignment cannot be detected until detection results of the radar and the camera are sufficiently stored. Thus, the axis misalignment cannot be detected if the vehicle does not run, and even after the vehicle starts to run, it takes a certain time to detect the axis misalignment, which is technically problematic.

SUMMARY

In view of the aforementioned problems, it is therefore an object of embodiments of the present disclosure to provide an axis misalignment determining apparatus configured to determine an axis misalignment in a sensor mounted on a vehicle.

The above object of embodiments of the present disclosure can be achieved by an axis misalignment determining apparatus configured to determine an axis misalignment in a sensor mounted on a vehicle by using a determining member mounted on the vehicle, the axis misalignment determining apparatus provided with: a storage configured to store therein a result of detection of the determining member by the sensor in a condition in which there is no axis misalignment, as a detection result in a normal case; an acquirer configured to detect the determining member by using the sensor and configured to obtain it as a present detection result; and a determinator configured to determine whether or not there is an axis misalignment in the sensor by comparing the present detection result with the detection result in the normal case.

DETAILED DESCRIPTION OF THE EMBODIMENTS

Hereinafter, an axis misalignment determining apparatus according to an embodiment will be explained with reference to the drawings. In the embodiment, an explanation is given to an apparatus configured to determine an axis misalignment in a LiDAR mounted on a vehicle.

<Configuration of Apparatus>

Figure 1:
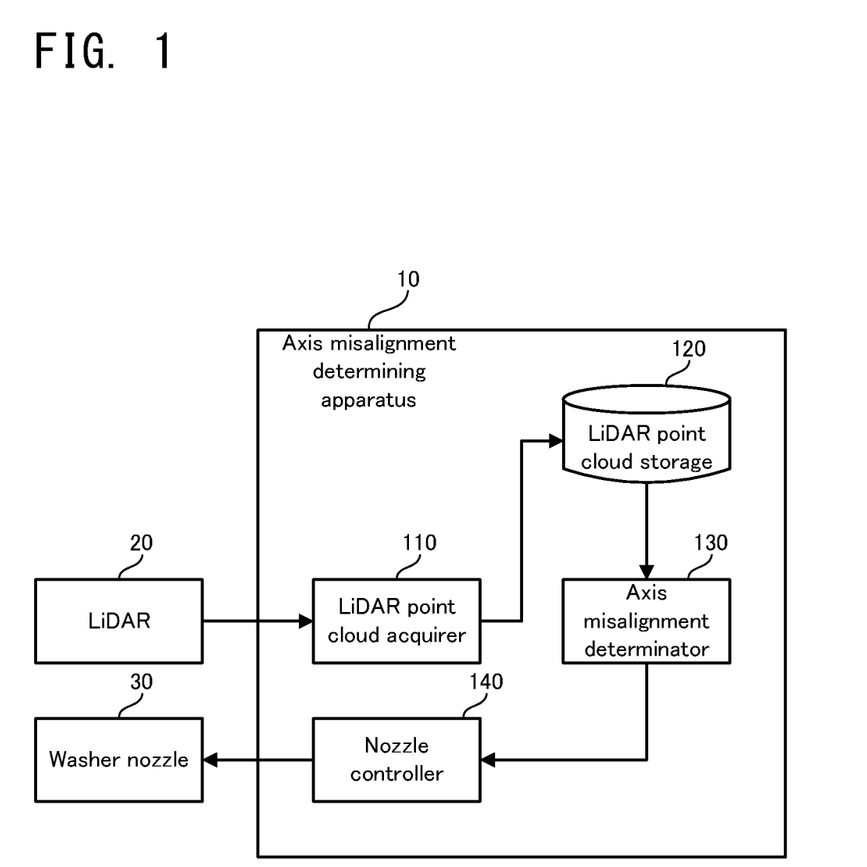
FIG. 1 is a block diagram illustrating a configuration of an axis misalignment determining apparatus according to an embodiment.

Firstly, an entire configuration of the axis misalignment determining apparatus according to the embodiment will be explained with reference to FIG. 1. FIG. 1 is a block diagram illustrating the configuration of the axis misalignment determining apparatus according to the embodiment.

As illustrated in FIG. 1, an axis misalignment determining apparatus 10 according to the embodiment is configured to be, for example, a part of an electronic control unit (ECU) mounted on a vehicle, and is provided with a LiDAR point cloud acquirer 110, a LiDAR point cloud storage 120, an axis misalignment determinator 130, and a nozzle controller 140, as processing blocks physically or logically realized therein.

The LiDAR point cloud acquirer 110 is a specific example of the "acquirer" in Supplementary Notes described later, and is configured to obtain a point cloud (i.e., a plurality of points indicating positions of a detected object), which is a detection result of a LiDAR 20 configured to detect an object in the surroundings of the vehicle. The LiDAR point cloud storage 120 is a specific example of the "storage" in Supplementary Notes described later, and is configured to store therein the point cloud obtained by the LiDAR point cloud acquirer 110. The axis misalignment determinator 130 is a specific example of the "determinator" in Supplementary Notes described later, and is configured to determine whether or not there is an axis misalignment in the LiDAR 20 by comparing a point cloud in a normal case stored in the LiDAR point cloud storage 120 and a present point cloud. The nozzle controller 140 is a specific example of the "position controller" in Supplementary Notes described later, and is configured to control a position of a washer nozzle 30, which is provided to wash the LiDAR 20.

Figure 2:
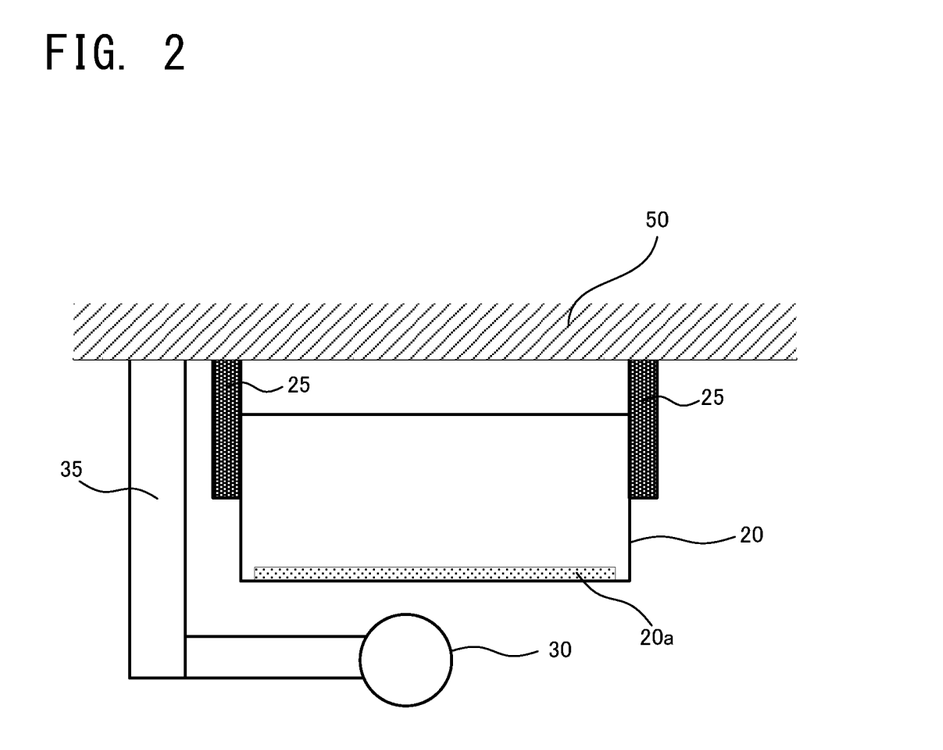
FIG. 2 is a top view illustrating an example of an arrangement configuration of a LiDAR and a washer nozzle.
Figure 3:
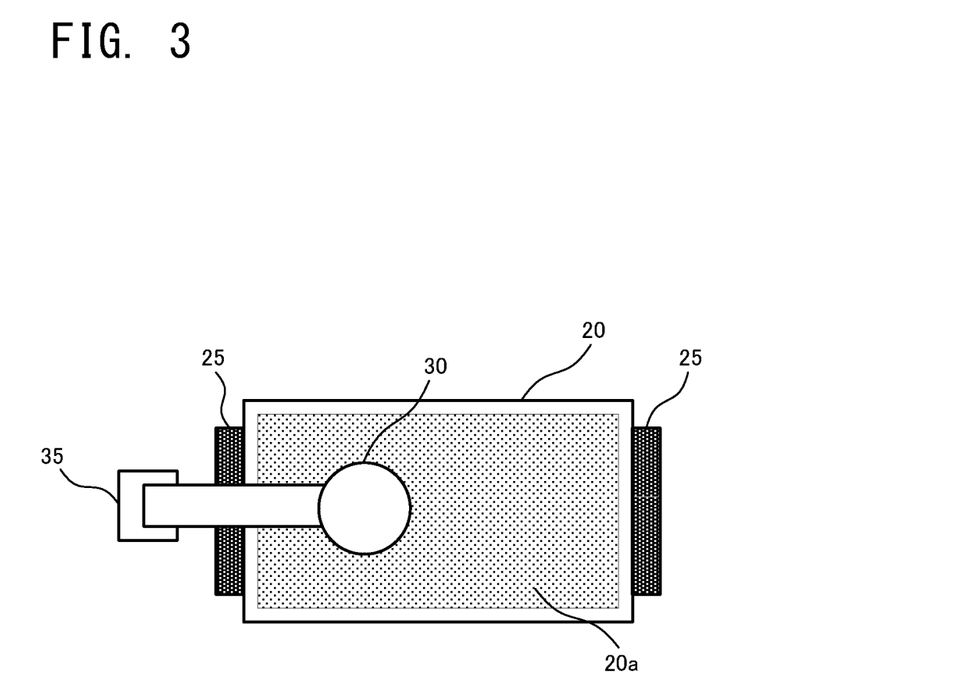
FIG. 3 is a front view illustrating the example of the arrangement configuration of the LiDAR and the washer nozzle.
Figure 4:
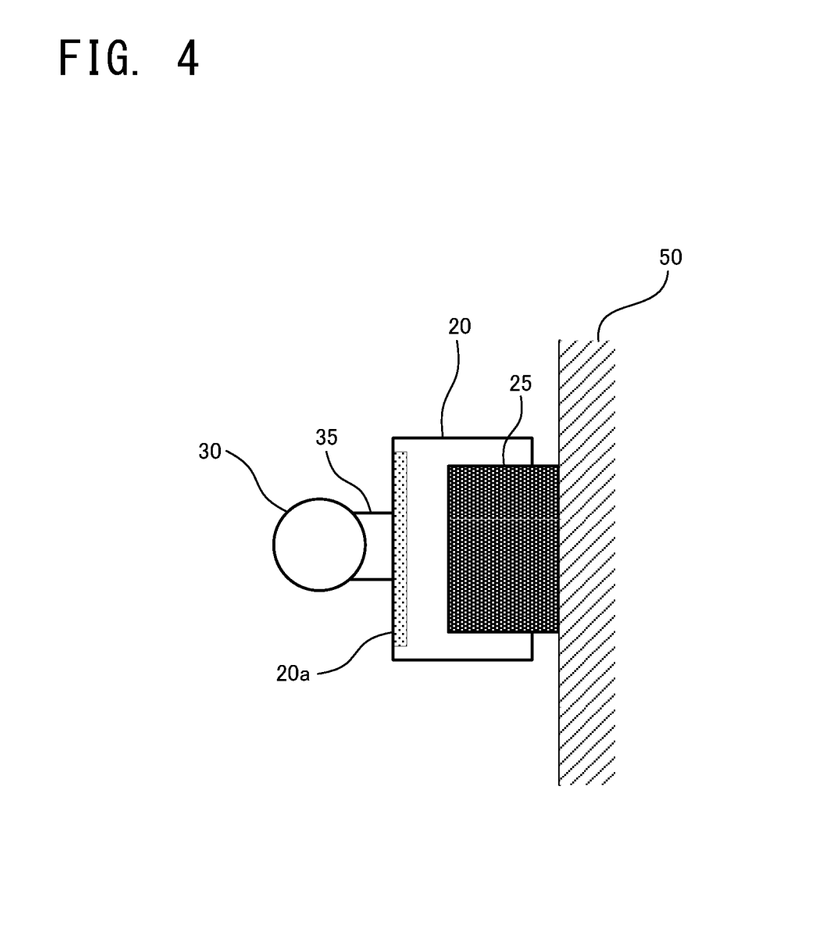
FIG. 4 is a side view illustrating the example of the arrangement configuration of the LiDAR and the washer nozzle.
Figure 5:
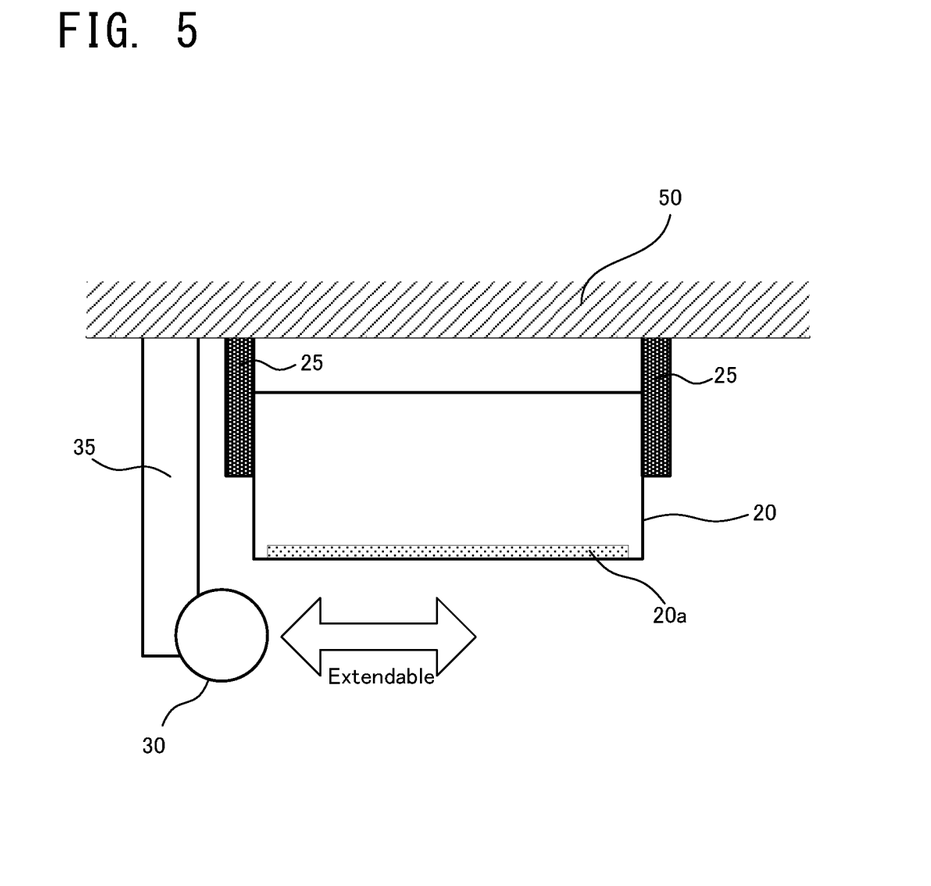
FIG. 5 is a top view illustrating a normal position of the washer nozzle.

Next, a specific arrangement configuration of the LiDAR 20 and the washer nozzle 30 described above will be explained with reference to FIG. 2 to FIG. 5. FIG. 2 is a top view illustrating an example of the arrangement configuration of the LiDAR and the washer nozzle. FIG. 3 is a front view illustrating the example of the arrangement configuration of the LiDAR and the washer nozzle. FIG. 4 is a side view illustrating the example of the arrangement configuration of the LiDAR and the washer nozzle. FIG. 5 is a top view illustrating a normal position of the washer nozzle.

As illustrated in FIG. 2 to FIG. 4, the LiDAR 20 is mounted in a part of a vehicle body 50 (e.g., a bumper part, etc.) via a LiDAR mounting mechanism 25. The LiDAR 20 is a specific example of the "sensor" in Supplementary Notes described later. The washer nozzle 30 is mounted in a position in which the washed nozzle 30 can wash an optical surface 20a of the LiDAR 20, i.e., a surface of the LiDAR 20 on which laser light is received and emitted. The washer nozzle 30 is mounted in a part of the vehicle body 50 via a washer nozzle mounting mechanism 35, which is different from the LiDAR mounting mechanism 25. As described above, the LiDAR 20 and the washer nozzle 30 are mounted by the respective mounting mechanisms that are independent of each other, i.e., by the LiDAR mounting mechanism 25 and the washer nozzle mounting mechanism 35. Thus, even if there is an axis misalignment (i.e., a position deviation) in the LiDAR 20, the washer nozzle 30 does not have the same axis misalignment. In other words, the LiDAR 20 and the washer nozzle 30 do not deviate integrally.

As illustrated in FIG. 5, the washer nozzle 30 is configured to be extendable, and the position of the washer nozzle 30 can be controlled by the nozzle controller 140. Specifically, the washer nozzle 30 is configured to move between a position in which its end portion overlaps on the optical surface 20a of the LiDAR 20, as illustrated in FIG. 2 to FIG. 4, and a position in which the end portion does not overlap the optical surface 20a of the LiDAR 20, as illustrated in FIG. 5. In other words, the washer nozzle 30 is configured to move between the position that can be detected by the LiDAR 20 (refer to FIG. 2 to FIG. 4) and the position that cannot be detected by the LiDAR 20 (refer to FIG. 5). Hereinafter, the position as illustrated in FIG. 2 to FIG. 4 will be referred to as a "determination position", and the position as illustrated in FIG. 5 will be referred to as a "normal position".

The washer nozzle 30 according to the embodiment is a specific example of the "determining member" in Supplementary Notes described later, and is a member whose position is to be detected by the LiDAR 20 in determining the axis misalignment in the LiDAR 20. Thus, when the position of the washer nozzle 30 is to be detected, the washer nozzle 30 may be moved to the determination position. On the other hand, if the washer nozzle 30 is always in the determination position, the presence of the washer nozzle 30 may reduce detection accuracy of a target that is to be originally detected by the LiDAR 20 (e.g., an obstacle in the surroundings of the vehicle, etc.). The washer nozzle 30 according to the embodiment is thus configured to move to the normal position, which is out of a detection range of the LiDAR 20. The washer nozzle 30 is moved to the determination position, not only in determining the axis misalignment in the LiDAR 20 but also in washing the optical surface 20a of the LiDAR 20, which is an original function of the washer nozzle 30.

Figure 6:
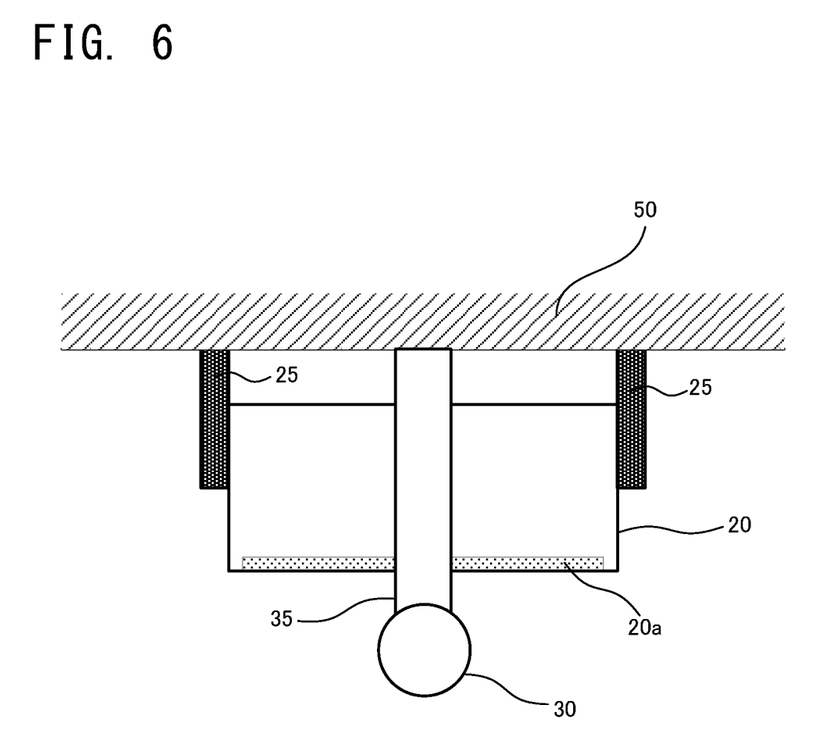
FIG. 6 is a top view illustrating a modified example of the arrangement configuration of the LiDAR and the washer nozzle.
Figure 7:
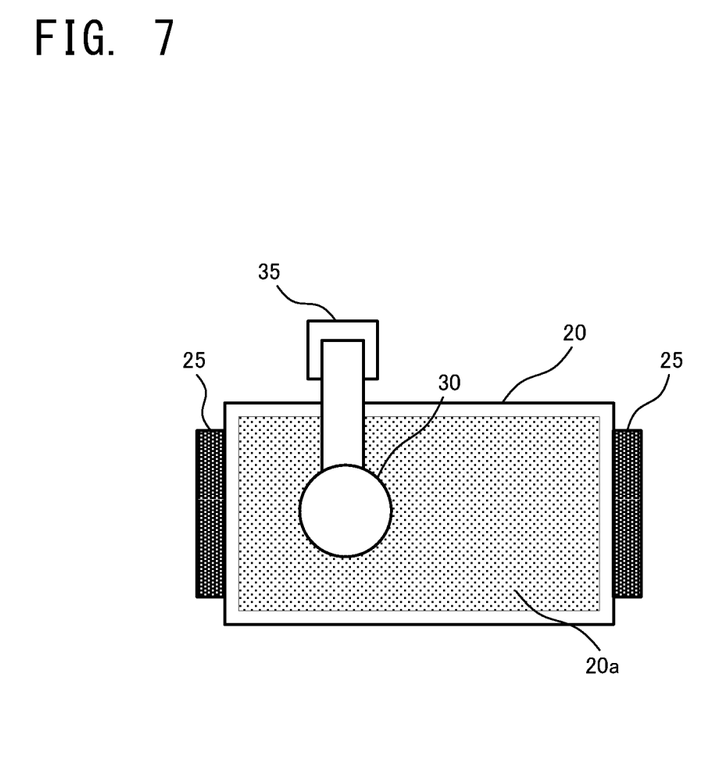
FIG. 7 is a front view illustrating the modified example of the arrangement configuration of the LiDAR and the washer nozzle.
Figure 8:
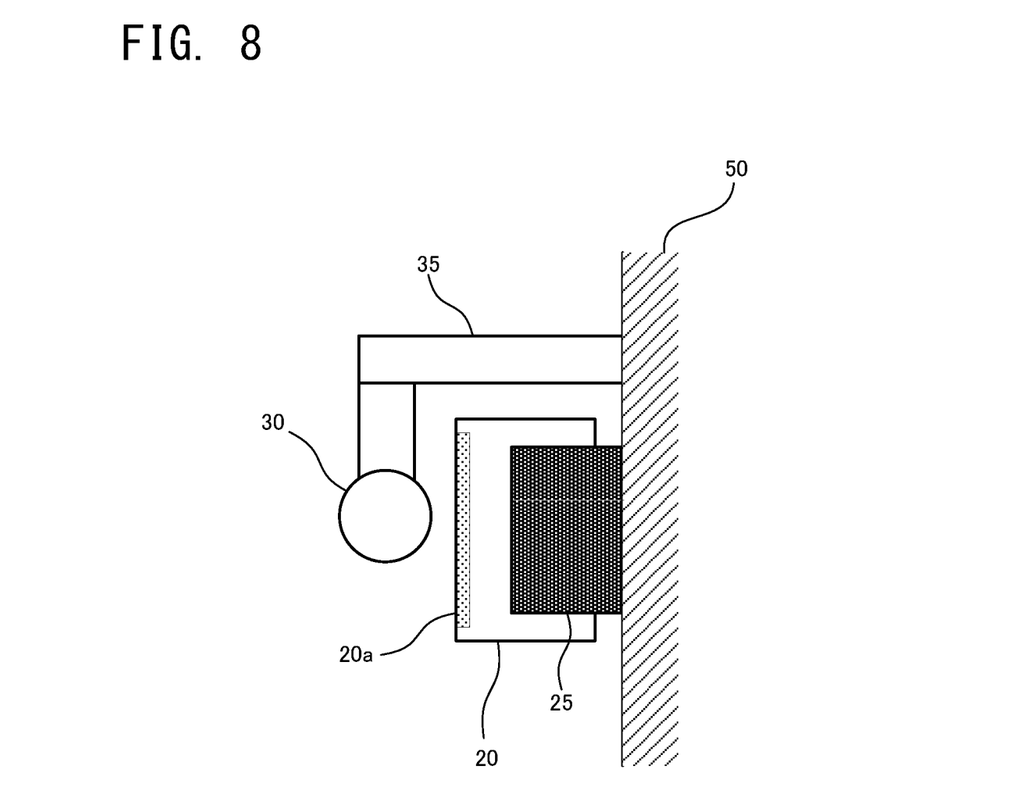
FIG. 8 is a side view illustrating the modified example of the arrangement configuration of the LiDAR and the washer nozzle.
Figure 9:
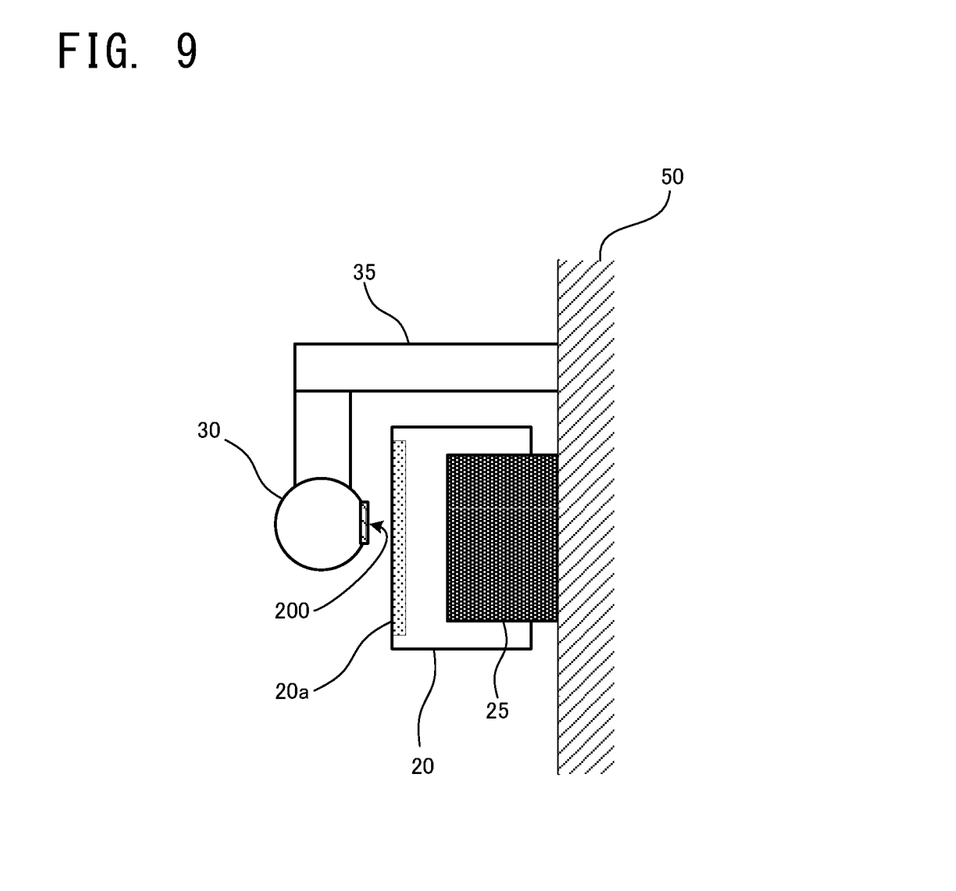
FIG. 9 is a side view illustrating a configuration the washer nozzle having a recursive reflective material.

Then, an arrangement configuration of an axis misalignment determining apparatus according to a modified example will be explained with reference to FIG. 6 to FIG. 9. FIG. 6 is a top view illustrating the modified example of the arrangement configuration of the LiDAR and the washer nozzle. FIG. 7 is a front view illustrating the modified example of the arrangement configuration of the LiDAR and the washer nozzle. FIG. 8 is a side view illustrating the modified example of the arrangement configuration of the LiDAR and the washer nozzle. FIG. 9 is a side view illustrating a configuration the washer nozzle having a high reflective material;

As illustrated in FIG. 6 to FIG. 8, the washer nozzle 30 may be mounted above the LiDAR 20. Even in this case, it is possible to provide the washer nozzle 30 with the same function as that when the washer nozzle 30 is mounted beside the LiDAR 20 as illustrated in FIG. 2 to FIG. 5. In other words, a mounting position of the washer nozzle 30 according to the embodiment is not particularly limited, and the washer nozzle 30 may be extendable in any direction with respect to the optical surface 20a of the LiDAR 20.

As illustrated in FIG. 9, the washer nozzle 30 may have a high reflective material 200 (e.g., a high reflective paint, a retro-reflective material, etc.) in a position opposed to the optical surface 20a of the LiDAR 30. In this case, the laser light from the LiDAR 20 is reflected with high reflectivity, and it is thus possible to detect the position of the washer nozzle 30, i.e., a point cloud corresponding to the washer nozzle 30.

<Normal Position Storage Operation>

Figure 10:
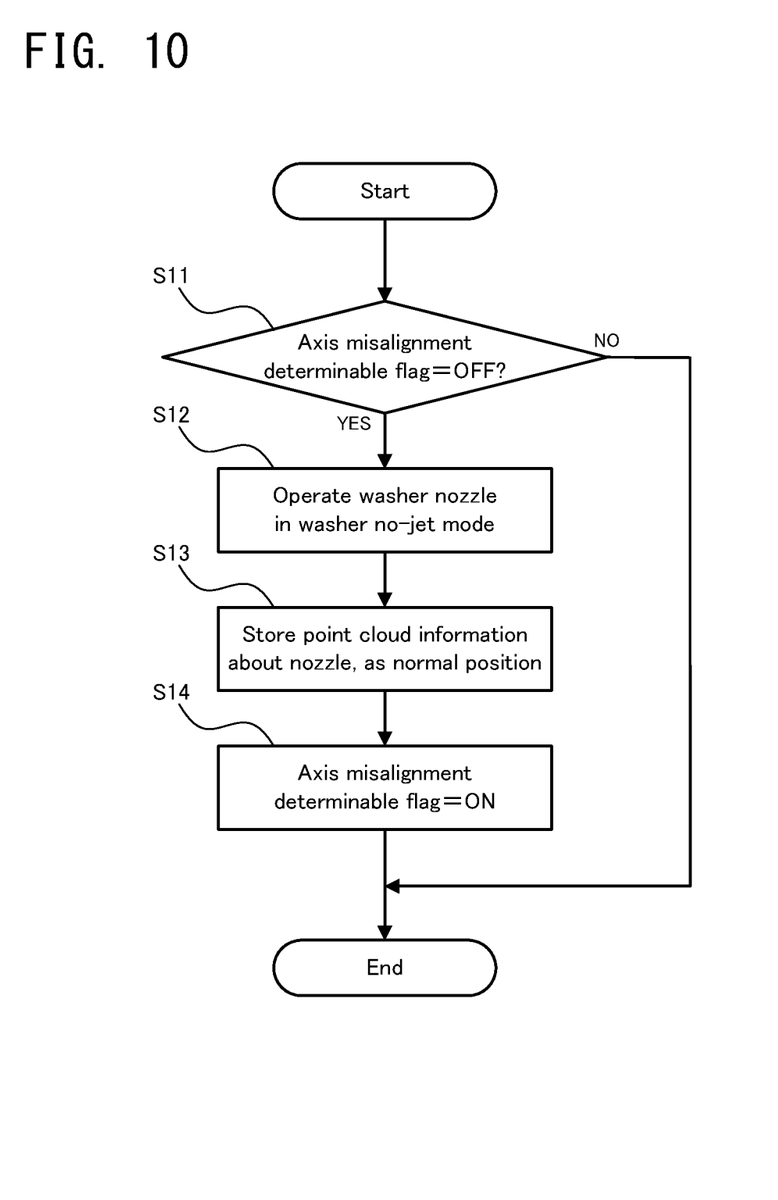
FIG. 10 is a flowchart illustrating a flow of a normal position storage operation by the axis misalignment determining apparatus according to the embodiment.

Next, a normal position storage operation performed by the axis misalignment determining apparatus 10 according to the embodiment, i.e., an operation of storing the detection result of the LiDAR 20 in the normal case, will be explained with reference to FIG. 10. FIG. 10 is a flowchart illustrating a flow of the normal position storage operation by the axis misalignment determining apparatus according to the embodiment.

As illustrated in FIG. 10, in the normal position storage operation, firstly, it is determined whether or not an axis misalignment determinable flag is OFF (step S11). The axis misalignment determinable flag may be a flag for determining whether or not the axis misalignment determining apparatus 10 is in a condition in which the axis misalignment determining apparatus 10 can determine the axis misalignment in the LiDAR 20. If the axis misalignment determinable flag is ON (the step S11: NO), it can be determined that the detection result of the LiDAR 20 in the normal case is already stored. The subsequent process is thus omitted, and a series of operation steps is ended.

On the other hand, if the axis misalignment determinable flag is OFF (the step S11: YES), the washer nozzle 30 is operated in a washer no-jet mode (in other words, in a mode in which the washing is not performed) (step S12). Specifically, the extension of the washer nozzle 30 may be controlled by the nozzle controller 140, so that the washer nozzle 30 is moved from the normal position to the determination position.

Then, information about the point cloud corresponding to the position of the washer nozzle 30 (hereinafter referred to as "point cloud information" as occasion demands) is stored as the normal position (step S13). Specifically, the LiDAR position cloud acquirer 110 may obtain the point cloud information corresponding to the washer nozzle 30 located in the determination position, and may store the point cloud information obtained by the LiDAR point cloud storage 120, as the normal position.

After the above process is ended, the axis misalignment determinable flag is set to ON (step S14). After that, it is possible to determine whether or not there is an axis misalignment in the LiDAR 20 on the basis of the stored normal position. The aforementioned normal position storage operation is to be performed in a condition in which there is no axis misalignment in the LiDAR 20. It is thus preferable to perform the normal position storage operation, for example, in factory shipping of the vehicle, or immediately after calibration of the LiDAR 20, or in similar situations.

<Axis Misalignment Determination Operation>

Figure 11:
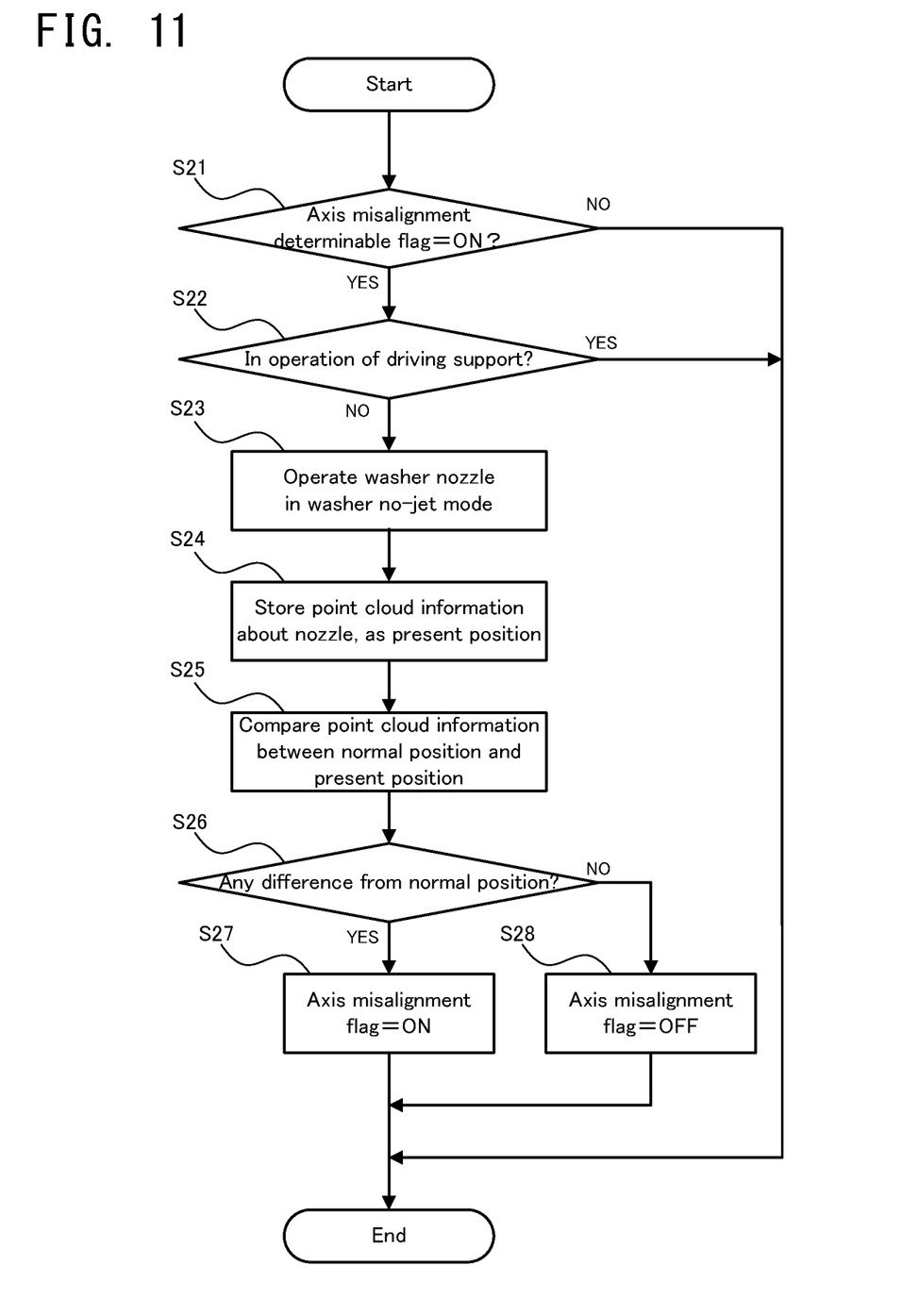
FIG. 11 is a flowchart illustrating a flow of an axis misalignment determination operation by the axis misalignment determining apparatus according to the embodiment.

Next, an axis misalignment determination operation performed by the axis misalignment determining apparatus 10 according to the embodiment, i.e., an operation of determining the axis misalignment in the LiDAR 20, will be explained with reference to FIG. 11. FIG. 11 is a flowchart illustrating a flow of the axis misalignment determination operation by the axis misalignment determining apparatus 10 according to the embodiment.

As illustrated in FIG. 11, in the axis misalignment determination operation, it is firstly determined whether or not the axis misalignment determinable flag is ON (step S21). If the axis misalignment determinable flag is OFF (the step S21: NO), the aforementioned normal position storage operation is not normally ended, and the axis misalignment of the LiDAR 20 cannot be determined at this point. The subsequent process is thus omitted, and a series of operation steps is ended. If the axis misalignment determinable flag is ON (the step S21: YES), it is determined whether or not a driving support of the vehicle is in operation (step S22). The driving support herein may indicate driving support control using the detection result of the LiDAR 20, and may exemplify a driving support in which an obstacle in the surroundings of the vehicle is detected by using the LiDAR 20 and in which a driving route for automatically avoiding the obstacle is set. The LiDAR 20 is used while operating the driving support, and thus, the axis misalignment determination operation may inhibit the function of the LiDAR, i.e., there is a possibility that the driving support is not normally performed. Thus, if it is determined that the driving support is in operation (the step S22: YES), the subsequent process is omitted, and the series of operation steps is ended. The series of operation steps may be started again from the beginning after a lapse of a predetermined period from the end.

If it is determined that the driving support is not in operation (the step S22: NO), the washer nozzle 30 is operated in the washer no-jet mode (step S23). In other words, as in the step S12 in the normal position storage operation (refer to FIG. 10), the extension of the washer nozzle 30 may be controlled by the nozzle controller 140, so that the washer nozzle 30 is moved from the normal position to the determination position.

Then, the point cloud information corresponding to the washer nozzle 30 is stored as a present position (step S24). Specifically, as in the step S13 in the normal position storage operation (refer to FIG. 10), the LiDAR position cloud acquirer 110 may obtain the point cloud information corresponding to the washer nozzle 30 located in the determination position, and may store the point cloud information obtained by the LiDAR point cloud storage 120, as the present position.

Then, the point cloud information is compared between the normal position and the present position (step S25). Specifically, the axis misalignment determinator 130 may read the point cloud information indicating the normal position and the point cloud information indicating the present position, which are stored in the LiDAR point cloud storage 120, and may compare the two point informations. The axis misalignment determinator 130 compares the point cloud information indicating the normal position and the point cloud information indicating the present position, and determines whether or not there is a difference between the two point cloud informations (step S26). More specifically, the axis misalignment determinator 130 may store therein, e.g., a predetermined threshold value for eliminating a detection error, and may determine there is a difference between the present position and the normal position if the difference between the point cloud information indicating the normal position and the point cloud information indicating the present position is greater than or equal to the predetermined threshold value. On the other hand, it is determined that the present invention does not have the difference from the normal position if the difference between the point cloud information indicating the normal position and the point cloud information indicating the present position is not greater than or equal to the predetermined threshold value.

As a result of the determination, if it is determined that the present position has the difference from the normal position (the step S26: YES), the axis misalignment determinator 140 sets an axis misalignment flag to ON (step S27). On the other hand, if it is determined that the present position has no difference from the normal position (the step S26: NO), the axis misalignment determinator 140 sets an axis misalignment flag to OFF (step S28). The axis misalignment flag may be a flag indicating whether or not there is an axis misalignment in the LiDAR 20, and if it is ON, an announcement process for an occupant of the vehicle (e.g., an alarm or a waning indicating that there is an axis misalignment in the LiDAR 20, etc.) is performed.

Figure 12:
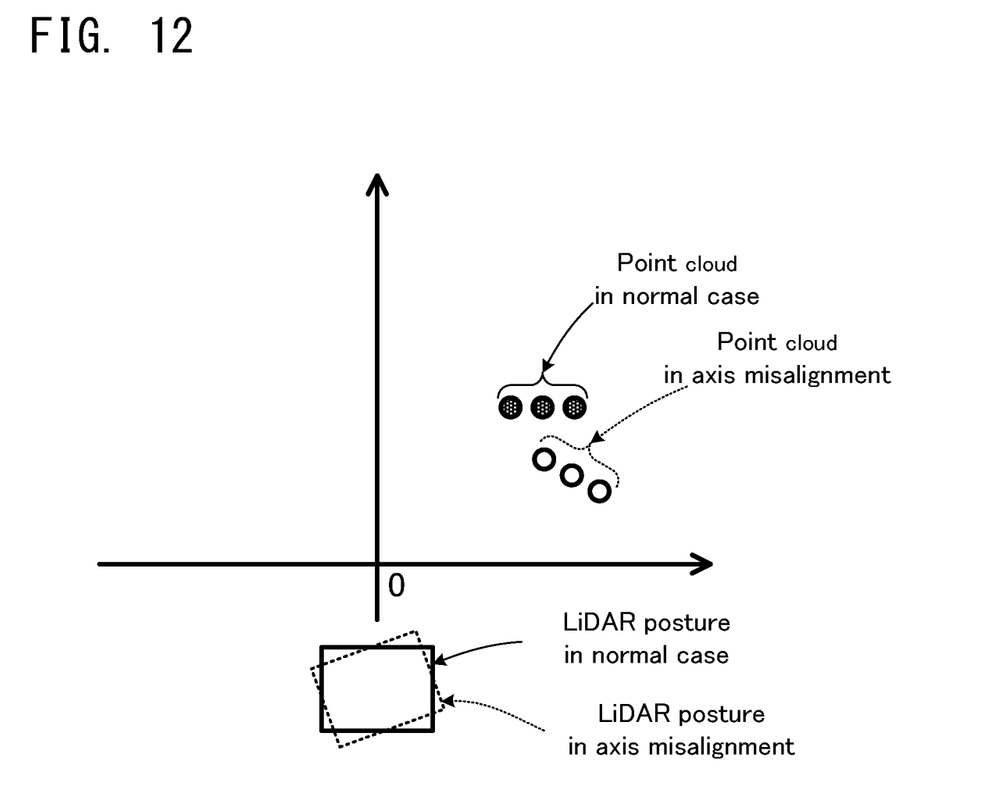
FIG. 12 is a conceptual diagram illustrating an example of a point cloud in a normal case and a point cloud in axis misalignment when the LiDAR is viewed from right above.
Figure 13:
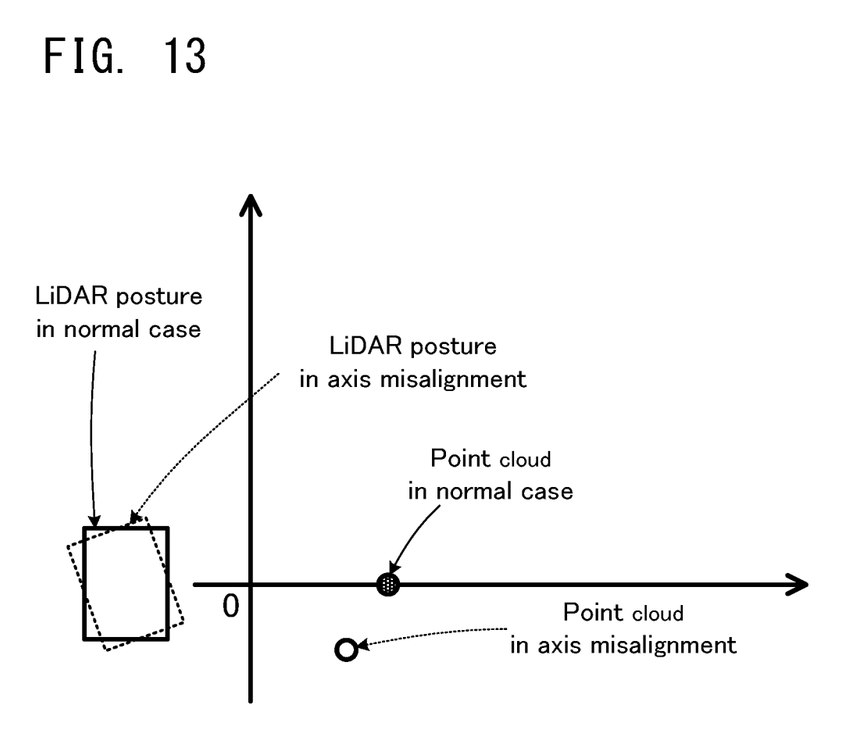
FIG. 13 is a conceptual diagram illustrating an example of the point cloud in the normal case and the point cloud in the axis misalignment when the LiDAR is viewed from the side.

Now, the comparison of the point cloud information will be specifically explained with reference to FIG. 12 and FIG. 13. FIG. 12 is a conceptual diagram illustrating an example of a point cloud in the normal case and a point cloud in the axis misalignment when the LiDAR is viewed from right above. FIG. 13 is a conceptual diagram illustrating an example of the point cloud in the normal case and the point cloud in the axis misalignment when the LiDAR is viewed from the side.

As illustrated in FIG. 12, suppose that the point cloud corresponding to the washer nozzle 30 is detected in black circle positions in FIG. 12 in the normal case, from a viewpoint in which the LiDAR 20 is viewed from right above. Then, if the axis misalignment in the LiDAR 20 occurs in a horizontal left direction, the point cloud corresponding to the washer nozzle 30 may be detected in white circle positions in FIG. 12. In other words, the axis misalignment occurs in the LiDAR 20, whereas the position of the washer nozzle 30 does not change. Thus, a relative position of the washer nozzle 30 as viewed from the LiDAR 20 changes in accordance with the axis misalignment in the LiDAR 20. As a result, it is detected that the point cloud information in the normal case is apparently different from the point cloud information after the axis misalignment.

As illustrated in FIG. 13, suppose that the point cloud corresponding to the washer nozzle 30 is detected in a black circle position in FIG. 13 in the normal case, from a viewpoint in which the LiDAR 20 is viewed from the side. Then, if the axis misalignment in the LiDAR 20 occurs in a vertical upward direction, the point cloud corresponding to the washer nozzle 30 may be detected in a white circle position in FIG. 13. In other words, the position of the washer nozzle 30 viewed from the LiDAR 20 is deviated downward by an amount of the upward axis misalignment in the LiDAR 20. As described above, it is possible to determine the axis misalignment in the LiDAR 20 by comparing the point cloud information in the normal case and the point cloud information after the axis misalignment. It is also possible to determine to what extent and in which direction the axis misalignment in the LiDAR 20 occurs, from a deviated direction and a deviated distance of the point cloud.

<Technical Effect>

Next, a technical effect of the axis misalignment determining apparatus 10 according to the embodiment will be explained.

According to the axis misalignment determining apparatus 10 in the embodiment, as explained above, it is possible to determine the axis misalignment in the LiDAR 20, from the detection result of the washer nozzle 30 by using the LiDAR 20. Particularly in the embodiment, the LiDAR 20 and the washer nozzle 30 are mounted by the mounting mechanisms that are independent of each other, i.e., by the LiDAR mounting mechanism 25 and the washer nozzle mounting mechanism 35. Thus, even if there is an axis misalignment (i.e., a position deviation) in the LiDAR 20, the washer nozzle 30 does not have the same axis misalignment. It is thus possible to accurately determine the axis misalignment in the LiDAR 20 on the basis of the relative position of the washer nozzle 30 as viewed from the LiDAR 20.

The member for detecting the axis misalignment in the LiDAR 20 may be another member other than the washer nozzle 30. Any member that is in the detection range of the LiDAR 20 and that does not have the integral axis misalignment with the LiDAR 20, i.e., a member having such a relative position to the LiDAR 20 that does not change due to any factor other than the axis misalignment in the LiDAR 20, can be also used to determine the axis misalignment in the LiDAR 20. The washer nozzle 30, however, is a member originally mounted in the position that can be detected by the LiDAR 20, in order to wash the optical surface 20a of the LiDAR 20. Thus, the use of the washer nozzle 30 makes it possible to avoid an increase in cost and an increase in size and complication of the apparatus.

In the embodiment, an example of the determination of the axis misalignment in the LiDAR 20 is explained; however, the target of the determination of the axis misalignment may be various sensors (e.g., a radar, a camera, etc.) other than the LiDAR 20 mounted on the vehicle. The existing technique/technology can be used, as occasion demands, to compare detection results of the various sensors, i.e., to determine whether or not there is a difference between the normal position and the present position.

<Supplementary Notes>

Various aspects of the present disclosure derived from the embodiment explained above will be explained hereinafter.

(Supplementary Note 1)

An axis misalignment determining apparatus described in Supplementary Note 1 is an axis misalignment determining apparatus configured to determine an axis misalignment in a sensor mounted on a vehicle by using a determining member mounted on the vehicle, the axis misalignment determining apparatus provided with: a storage configured to store therein a result of detection of the determining member by the sensor in a condition in which there is no axis misalignment, as a detection result in a normal case; an acquirer configured to detect the determining member by using the sensor and configured to obtain it as a present detection result; and a determinator configured to determine whether or not there is an axis misalignment in the sensor by comparing the present detection result with the detection result in the normal case.

According to the axis misalignment determining apparatus described in Supplementary Note 1, it is determined whether or not there is an axis misalignment in the sensor by comparing the result of the detection of the determining material by the sensor in the condition in which there is no axis misalignment, i.e., the detection result in the normal case, and the result of the detection of the determining member by the present sensor, i.e., the present detection result. Specifically, if there is a significant difference between the detection result in the normal case and the present detection result, it is determined that there is an axis misalignment in the sensor. If there is little difference between the detection result in the normal case and the present detection result, it is determined that there is no axis misalignment in the sensor. The "condition in which there is no axis misalignment" may mean a condition in which a detection direction of the sensor is as intended in design. It is thus preferable that the detection result in the normal case is stored in factory shipping or immediately after calibration.

Particularly in this aspect, the determining member mounted on the vehicle is used as a determination reference of the axis misalignment. It is thus possible to determine the axis misalignment, extremely easily and accurately, for example, in comparison with when an object that is outside the vehicle is used as a reference. It is also sufficient to compare the detection result in the normal case, i.e., the detection result in the past, and the present detection result. It is thus not necessary to store, for example, a large amount of detection results of the sensor, and the axis misalignment can be determined in a short time.

(Supplementary Note 2)

In an aspect of the axis misalignment determining apparatus described in Supplementary Note 2, it is further provided a position controller configured to move the determining member between a normal position, which is out of a detection range of the sensor, and a determination position, which is in the detection range of the sensor.

According to this aspect, if the axis misalignment in the sensor is not determined, the determining member can be moved out of the detection range of the sensor. It is thus possible to avoid inhibiting an original function of the sensor (e.g., recognition of an object that is outside the vehicle, etc.) due to regular presence of the determining member in the detection range of the sensor.

(Supplementary Note 3)

In another aspect of the axis misalignment determining apparatus described in Supplementary Note 3, the sensor and the determining member are separately mounted on the vehicle by using respective mounting mechanisms that are independent of each other.

According to this aspect, when there is an axis misalignment in the sensor, it is possible to prevent the determining member from having the same misalignment. Thus, the position of the determining member as the determination reference does not change even when there is an axis misalignment in the sensor. It is therefore possible to accurately determine the axis misalignment in the sensor by using the detection result of the determining member.

(Supplementary Note 4)

In the axis misalignment determining apparatus described in Supplementary Note 4, it is further provided with a high reflective material, which is provided in a position of the determining material opposed to the sensor and which has higher reflectivity than that of the determining member.

According to the axis misalignment determining apparatus described in Supplementary Note 4, detection accuracy of the determining member by the sensor is improved. It is thus possible to more accurately determine the axis misalignment in the sensor.

(Supplementary Note 5)

In the axis misalignment determining apparatus described in Supplementary Note 5, the determining member is a washer nozzle configured to wash the sensor.

According to the axis misalignment determining apparatus described in Supplementary Note 5, it is not necessary to separately provide an exclusive part as the determining member. It is thus possible to prevent complication and an increase in size of the apparatus, and an increase in manufacturing cost.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An axis misalignment determining apparatus configured to determine an axis misalignment in a light detection and ranging (LiDAR) sensor mounted on a vehicle by using a nozzle mounted on the vehicle, said axis misalignment determining apparatus comprising at least one processor configured to:
   store a result of detection of the nozzle by the LiDAR sensor in a condition in which there is no axis misalignment, as a normal detection result;
   detect the nozzle by using the LiDAR sensor and obtain a present detection result; and
   determine whether or not there is the axis misalignment between the LiDAR sensor and the vehicle, the LiDAR sensor is mounted on, by comparing the present detection result with the normal detection result.

2. The axis misalignment determining apparatus according to claim 1, wherein the at least one processor is further configured to move the nozzle between a non-detection position, which is outside of a detection range of the LiDAR sensor, and a determination position, which is in the detection range of the LiDAR sensor.

3. The axis misalignment determining apparatus according to claim 1, wherein the LiDAR sensor and the nozzle are separately mounted on the vehicle by using respective mounting mechanisms that are independent of each other.

4. The axis misalignment determining apparatus according to claim 1, further comprising a high reflective material, which is provided in a position of the nozzle opposed to the LiDAR sensor and which has higher reflectivity than that of the nozzle.

5. The axis misalignment determining apparatus according to claim 1, wherein the nozzle is a washer nozzle configured to wash the LiDAR sensor.

* * * * *